United States Patent
Pratt et al.

(10) Patent No.: US 12,471,538 B2
(45) Date of Patent: Nov. 18, 2025

(54) FORAGE FEED HAY BALE FRACTIONATION AND FEED PRODUCT PROCESSING METHOD

(71) Applicant: GREEN GOLD DEVELOPMENT, LLC, Aberdeen, ID (US)

(72) Inventors: Christopher A. Pratt, Aberdeen, ID (US); A. Scott Jackson, Jerome, ID (US)

(73) Assignee: GREEN GOLD DEVELOPMENT, LLC, Aberdeen, ID (US)

( * ) Notice: Subject to any disclaimer, the term of this patent is extended or adjusted under 35 U.S.C. 154(b) by 1104 days.

(21) Appl. No.: 17/232,636

(22) Filed: Apr. 16, 2021

(65) Prior Publication Data

US 2022/0330488 A1 Oct. 20, 2022

(51) Int. Cl.
  *A01F 29/00* (2006.01)
  *A23K 10/37* (2016.01)
  *A23K 40/20* (2016.01)
  *A23N 17/00* (2006.01)

(52) U.S. Cl.
  CPC ............ *A01F 29/005* (2013.01); *A23K 10/37* (2016.05); *A23K 40/20* (2016.05); *A23N 17/005* (2013.01)

(58) Field of Classification Search
  CPC ....... A23K 40/20; A23K 40/25; A23N 17/005
  See application file for complete search history.

(56) References Cited

U.S. PATENT DOCUMENTS

| | | | | |
|---|---|---|---|---|
| 4,022,915 A | * | 5/1977 | Zukerman | A23K 40/30 426/805 |
| 4,153,735 A | * | 5/1979 | Mommer | A23K 40/25 426/601 |
| 5,855,943 A | * | 1/1999 | Lush | A23K 40/20 426/516 |
| 7,721,984 B2 | * | 5/2010 | Bootsma | A01D 90/10 241/101.76 |
| 9,591,807 B1 | * | 3/2017 | Siebenga | A01F 15/101 |

(Continued)

FOREIGN PATENT DOCUMENTS

CN 110301662 A * 10/2019

OTHER PUBLICATIONS

English Translation for Wang et al. (CN 110301662). (Year: 2019).*

*Primary Examiner* — Seyed Masoud Malekzadeh
(74) *Attorney, Agent, or Firm* — Richard D. Clarke

(57) ABSTRACT

The present application is directed to a system and processing method for fractionating pre-formed forage hay bales into a fractionated leaf portion and a fractionated stem portion. More particularly, the system involves grinding, chopping and shredding bales, and fractionating the chopped and shredded bales using a shaker table and grate assembly, into a fractionated leaf portion and a fractionated stem portion using a shaker table. The resulting fractionated leaf portion and fractionated stem portion can then be further processed into pellets for animal feed products, or the fractionated stem portion can be re-baled. Pelletization includes customizing the size of the pellets and the addition of additives to the pellets according to customers specifications for customized animal feed products. Pellets derived from the fractionated leaf portion and the fractionated stem portion are then packaged, typically in bags, for storage and transport.

10 Claims, 10 Drawing Sheets

(56) References Cited

U.S. PATENT DOCUMENTS

| | | | | |
|---|---|---|---|---|
| 11,382,343 B1* | 7/2022 | Pendleton | ............... | A23K 30/12 |
| 2004/0265950 A1* | 12/2004 | Darling | .................. | A23K 40/25 |
| | | | | 435/68.1 |
| 2008/0213066 A1* | 9/2008 | Bootsma | ................ | A01D 90/10 |
| | | | | 414/25 |
| 2016/0309747 A1* | 10/2016 | Darling | .................. | A23K 50/40 |
| 2018/0213722 A1* | 8/2018 | Pratt | .................... | A01D 43/063 |
| 2022/0232778 A1* | 7/2022 | Siebenga | ................ | A01F 15/04 |

* cited by examiner

STEP 3
SIZING OF FRACTIONATED LEAF PORTION (FLP)

HAMMER MILL SIZES THE FLP AND SIZED FLP IS SENT TO PELLET MILL — 60

STEP 4
PELLETIZATION OF FLP

DEPENDING ON DIE USED IN PELLET MILL THE SIZE AND LENGTH OF FLP PELLETS MAY BE CUSTOMIZED — 62

↓

PELLET MILL GENERATES FLP PELLETS AND ALLOWS FOR SIZING AND ADDITIVE CUSTOMIZATION DURING THE PELLETIZATION STEP — 64

STEP 5
PACKAGING OF PELLETS

FLP PELLETS ARE PACKAGED FOR STORAGE AND TRANSPORTATION — 66

FIG. 5

FORAGE FEED HAY BALE FRACTIONATION AND FEED PRODUCT PROCESSING METHOD

FIELD OF THE INVENTION

This application relates to a system and processing method for fractionating existing forage hay bales into a fractionated leaf portion and a fractionated stem portion. More particularly, the system involves grinding, chopping and shredding bales, and fractionating the chopped and shredded bales using a shaker table and grate assembly into a leaf portion and a stem portion using a shaker table. The leaf portion and stem portion can then be further processed into pellets for animal feed products, or the stem portion can be re-baled. Pelletization includes customizing the size of the pellets and the addition of additives to the pellets. Pellets derived from the leaf portion and the stem portion are then packaged, typically in bags, for storage and transport.

BACKGROUND OF THE INVENTION

Haymaking combines science and art. Old timers knew just the right feel of hay before it was ready to put into the barn. It's hard to quantify that judgment with mechanical instruments. The goal of haymaking is to capture the nutrients in grass in a storable form to make them available as a forage feed in the winter months. The process of making hay has steadily changed through the years from the earliest methods used of cutting grass with a scythe and raking it with a wooden hand rake, to the horse-drawn machinery of the 1800s and the tractor-powered processes developed and improved upon over the last 100 years. If you use hay to feed livestock, determining if you would purchase your hay from someone or bale it yourself is really dependent on the scope of your needs and your availability to hay land and the equipment necessary to bale it.

One of the most critical factors in making quality dry hay is timing. Producers need to time haymaking to coincide with the right stage of plant growth and weather conditions. The old timers used to talk about cutting hay around the Fourth of July, when they would say "it was stout and had some bottom to it." Although maximum growth of the plant and peak yields occur around that time, the nutrient value is greatest earlier in the season, when plants put most of their energy into vegetative growth and contain high concentrations of starches, proteins and minerals. As plants mature, their lignin content (a component of fiber) increases and traps the nutrients within indigestible cell walls. Although cutting hay early will result in lower yields, the increase in nutritive value will compensate for reduced yields. The second, third and fourth cuttings that grow back are leafy and high in quality and often harvested when the weather is hotter, making the hay easier to cure. Sometimes growers need to make a little sacrifice by getting an early first crop from the field during periods of rainy, early summer weather in order to get the next crop growing. Regardless of the amount of hay you produce in a year, it all can be broken down into four basic steps: cutting also known as mowing, tedding, raking, and baling.

Mowing. The first step in haymaking is mowing the hay. The maturity of the grass is the determining factor for starting the first field of the season. The grass should be in the early vegetative stage, and not headed out, with enough growth to make mowing worthwhile. Time your mowing around the most reliable weather forecast you can find. It basically takes about three days of good weather to cure hay. This can be a challenge in late May or early June. A good strategy is to mow just before or right after a rain, because of the likelihood of good weather for the next few days. Some people like to mow early in the morning to gain almost a day of drying time. Others prefer to mow at the end of the day when the grass is drier, in an attempt to increase the energy level of the forage by capturing some of the sugars that migrate up the plant stem during the day. The timing of the first cutting of hay of the year is based on the stage of plant growth and the conditions—predominantly weather— that are most favorable to allow the cut hay to dry out for the rest of the baling process. It's a good practice to rely on a weather forecasting model that will give you at least a few days of dry conditions from the time of your hay mowing. A general rule of thumb is that it takes about three days of good drying weather to cure hay for baling. Some common equipment used for mowing hay are the sickle mower and the rotary disc mower.

Tedding. Once the hay starts to dry, it needs to be worked to promote curing. Tedding, the next step in haymaking, fluffs up the cut hay and allows the air and sun to contact the under-surfaces to promote drying. Hay tedders are generally wide units with several orbital wheels that lift the hay as they turn. Some styles have horizontal bars with teeth on a spinning reel. Some people ted immediately after mowing to spread out the swath. Once hay is cut and laying on the ground, it requires a period of drying time so that the hay doesn't get baled with a high moisture content, which can cause it to mold or spoil. Tedding is the process of using an implement to lift or fluff up the hay once it has been cut, to promote thorough drying of all parts of the hay. Tedding actually will move the bottom of the windrow up to the top to maximize air circulation. Tedders have several wheels that lift the hay as it turns, and there are also models that employ a long horizontal bar that has a reel that rotates as the tedder moves forward. Hay mowed early in the morning could be tedded that afternoon, as long as the mowed swath is dry on the top surface. It may require a second tedding the next day to speed up the drying process. Too much tedding can shatter leaves of alfalfa or clover, lowering the quality of the hay. Proper tedding can be the key to timely haymaking.

Raking. Once the hay has been tedded and is nearly dry, it is ready to rake. Raking turns the hay one more time to dry the bottom and forms it into a windrow ready to be baled. The windrows shouldn't be rolled too tightly, as this creates a roping effect that prevents the hay from drying properly and causes it to clog as it enters the baler. Raking is the final step in the drying process and pulls the hay into windrows for baling. There are several types of rakes available, with the most popular being the wheel rake and the rotary rake. As a rule of thumb, wait to rake hay until after the dew has dried and the sun nears its peak, or around 11:00 am. If possible, let the raked hay sit for an hour or two before baling to allow more drying time.

Baling. Science and art converge in haymaking with the critical decision of when to start baling. Baling hay too early will trap moisture in the bale and result in spoilage. Baling too dry will cause leaves to shatter and break, lowering hay quality. It takes close visual observation and handling of clumps of hay from several windrows to "feel" if it is ready. Hay ready to bale will have no bunches of green grass. It will have a brittle, crisp feel. To test its readiness, grab a clump of hay and hold one end of the clump in each hand. Pull vigorously with both hands. If the stalks break on the first pull, the hay is ready to bale. If it takes several pulls, it's still too green. Some haymakers like to use an electronic moisture tester to confirm their own observations. It takes a clear, sunny day to make hay. Although you may feel tempted to speed up the haymaking process when it is overcast or sprinkling lightly, it isn't worth the risk of baling hay that will mold. It makes sense to add preservatives when you bale under borderline weather conditions, but small operations generally can't justify the costs of the needed equipment. Furthermore, the preservatives may corrode the equipment.

Round or square. Hay can be made into round or square bales. Contrary to some beliefs, large, round bales don't offer more flexibility in moisture content, but must be adequately dried. Since the core is packed very tightly, moisture can't escape, accelerating heat build-up. Some people store large, round bales outside, but with a 6-foot diameter bale, approximately 30 percent of the hay is wrapped in the outer six-inch layer. A few inches of spoilage results in a significant loss of dry matter. Big, round bales can be stored in a large, high-clearance shed; grouped in stacked rows and covered with plastic, or individually wrapped as they are baled. While round bales do offer the advantage of mechanical handling, they may be difficult to market to small livestock producers. The square bales can be beneficial for people with fewer animals as they tend to be easier to handle and store. Conversely, for larger farming operations, round bales are more efficient and they are less prone to spoilage because they are packed so densely and can shed water on their own. Horse owners tend to like square bales as they are easier to handle in stalls and with one or just a few horses, there is less waste. Cattle producers like the ease and efficiency of hauling large round bales to pastures or feed lots, and with a tractor and a bale fork, one person can move a lot of hay by themselves.

Storage. Once hay is baled, for long-term protection and quality it should be stored in barns or sheds to protect it from the elements. If you don't have a means of storing the hay inside, bales can be stacked in place and tarped. If your only option is to store the bales outside, round bales tend to suffer less damage due to the tight winding of the bale and natural water-shedding shape. As mentioned earlier, round bales may also be wrapped with a plastic sheeting as an additional way to keep moisture out. With too little moisture, hay becomes brittle, loses nutritional value, and is unpalatable for livestock. With too much moisture, hay can spoil while baled hay can experience thermal expansion possibly causing it to combust and creating a severe hazard. You can store hay indefinitely if the stack is managed correctly; although, in humid climates, using hay within three years of harvest is ideal. Hay growers need to bale it at correct moisture levels because if it's baled too damp the hay will generate heat, which leads to molding. Barn storage, especially long term, is best as it will prevent damage from weather. Rodents and other animals should be kept out and hay should be stored off the floor. Bales places directly on concrete could sweat and, if placed on the ground, might wick up moisture, which could result is losing up to 50% of your bottom bales. Placing hay on pallets or a thick layer of old hay or straw is recommended.

Field Losses and Quality Changes. Nutrients lost while the hay dries in the field lower forage quality. These losses occur for several reasons: Plant respiration converting plant sugars to water and carbon dioxide increases the fiber and decreases the energy in the feed. Drying hay as rapidly as possible limits respiration losses. Rain falling on hay before baling leaches out valuable nutrients and reactivates plant respiration. Getting hay wet is the biggest frustration of haymaking. It lessens the quality and requires repetition of the hay-drying steps to prepare the hay again for baling. If you only expect a light rain and can't haul the hay under cover, consider baling the hay up tight and letting moisture from the rain dry off for a day before putting the bales in the barn. Although losing small amounts of nutrient-rich leaves is normal during the haymaking process, raking when the hay is extremely dry will increase these losses. Hay should be handled as little as possible to maintain nutrient quality. Long-term hay storage will result in some nutritional losses. Most will occur in the first couple of months with overall dry matter losses up to about 5% in the first year. After the first couple of months losses in protein and energy are minimal such that the energy and protein profile of hay that is a year or two old will be fairly similar to when it was about six months old. The one nutrient that is lost in storage is vitamin A or, more specifically the pre-cursor to vitamin A, beta-carotene. Hay loses about 10% of its beta-carotene per month, so year-old hay is not a good source of this important fat soluble vitamin. However many commercial feeds and supplements provide additional vitamin A sources at levels greater than requirement, so the horse's needs should be met by feeding these.

Bale Processing. To date there has been no way for farmers and ranchers to process preexisting formed bales except the bale processor. The bale processor is a large piece of farm equipment used to grind bales and eject the hay onto the ground. Bale processors are used to maximize hay supplies by reducing hay losses, reduce stress and risk of contaminants to your herd while increasing hay palatability, provide a healthier and cleaner open-range feeding environment compared to feed rings, ensure all cattle get an equal opportunity at feeding time, plus they give you a fast, effective way to produce a thick, uniform mat of hay or cornstalks for winter bedding.

A significant amount of forage feed hay is lost each year due to spoilage or aging from non-use. Often, hay bales sit in stacks in the field or barn until they break down and become useful only for animal bedding instead of a quality feed source. This problem could be solved if there were a way to convert forage feed hay bales into a usable form for animal feeding. Also, it would be advantageous to hay farmers if they could produce quality fractionated feed products from existing forage feed hay bales. The purpose of the present invention is to give hay farmers a way to do just that, take existing stored bales and turn them into lucrative customized animal feed products.

Fractionation. Additionally, it is known that fractionating the leaf portion and stem portion of forage leaf crops is advantageous to the farmer, in that it allows for leaf product feed products and stem portion feed products to be customized. By fractionating the leaf portion, and separating it from the stem portion, custom blends of leaf portion and stem portions are enabled. Thus, feed products, typically in the form of pellets, may contain varying nutritional content, and have additives added in the customization process. This leaf/stem fractionation in the crop field was first disclosed in both U.S. patent application Ser. No. 15/881,286 titled Multipurpose Leaf Crop Harvesting Apparatus and Processing Method (claiming a method for immediate removal from the crop field and direct processing of a fractionated leaf crop), and U.S. patent application Ser. No. 16/827,973 titled Multipurpose Leaf Crop Harvesting Apparatus and Processing Method (a divisional application of U.S. patent application Ser. No. 15/881,286 claiming the apparatus for leaf/stem fractionation in the field), which the contents of both applications are hereby incorporated by reference herein. These incorporated referenced patent applications, authored by the same inventors as the present application, describe a way to fractionate leaf crops in the field into a leaf portion and a stem portion. This fractionation must be accomplished before baling. The present invention enables fractionation of pre-formed existing forage feed hay bales, and therefore applies to bales already formed in the field or put up for storage.

In this respect, before explaining at least one embodiment of the Forage Feed Hay Bale Fractionation System and Feed Product Processing Method in greater detail, it is to be understood that the design is not limited in its application to the details of construction and to the arrangement of the components set forth in the following description or illustrated in the drawings. The Forage Feed Hay Bale Fractionation System and Feed Product Processing Method is capable of other embodiments and of being practiced and carried out in various ways. Also, it is to be understood that the phraseology and terminology employed herein are for the purpose of description and should not be regarded as limiting.

SUMMARY OF THE INVENTION

The primary advantage of the Forage Feed Hay Bale Fractionation System and Feed Product Processing Method is that it provides a system and method for processing bales into high quality customizable animal feed products.

Another advantage of the Forage Feed Hay Bale Fractionation System and Feed Product Processing Method is that it provides a processing plant component machinery layout system for the purpose of processing bales into high quality customizable animal feed products.

Yet another advantage of the Forage Feed Hay Bale Fractionation System and Feed Product Processing Method is that it provides a step by step method for processing bales into high quality customizable animal feed products.

A further advantage of the Forage Feed Hay Bale Fractionation System and Feed Product Processing Method is that it provides a system for fractionating forage hay bales into a leaf portion and a stem portion.

Another advantage of the Forage Feed Hay Bale Fractionation System and Feed Product Processing Method Forage Feed Hay Bale Fractionation System and Feed Product Processing Method is that it provides a system for fractionating forage hay bales into a leaf portion and moreover into different sizes of leaf portion material.

Yet another advantage of the Forage Feed Hay Bale Fractionation System and Feed Product Processing Method is that it provides a system for fractionating forage hay bales into a stem portion and moreover into different sizes of stem portion material.

A further advantage of the Forage Feed Hay Bale Fractionation System and Feed Product Processing Method is that it provides for pelletization of the fractionated leaf portions and the fractionated stem portions.

Another advantage of the Forage Feed Hay Bale Fractionation System and Feed Product Processing Method Forage Feed Hay Bale Fractionation System and Feed Product Processing Method is that it provides for re-baling of the fractionated stem portion.

Yet another advantage of the Forage Feed Hay Bale Fractionation System and Feed Product Processing Method is that it provides a mobile unit system for facilitating the step by step method for processing bales into fractionated leaf portions and fractionated stem portions in the field, or on site at the farm or ranch, where haymaking is actively done or where hay bales are stored.

These together with other advantages of the Forage Feed Hay Bale Fractionation System and Feed Product Processing Method, along with the various features of novelty, which characterize the design are pointed out with particularity in the claims annexed to and forming a part of this disclosure. For a better understanding of the Forage Feed Hay Bale Fractionation System and Feed Product Processing Method its operating advantages and the specific objects attained by its uses, reference should be made to the accompanying drawings and descriptive matter in which there are illustrated the preferred and alternate embodiments of the Forage Feed Hay Bale Fractionation System and Feed Product Processing Method. There has thus been outlined, rather broadly, the more important features of the design in order that the detailed description thereof that follows may be better understood, and in order that the present contribution to the art may be better appreciated. There are additional features of the Forage Feed Hay Bale Fractionation System and Feed Product Processing Method that will be described hereinafter, and which will form the subject matter of the claims appended hereto.

The preferred embodiment of the Forage Feed Hay Bale Fractionation System and Feed Product Processing Method will consist of a processing plant including the system machinery to perform eight steps in the fractionation product generation process: STEP 1—Bale Grinding is performed using a modified bale grinder/processor; STEP 2—Fractionation of Leaves and Stems is accomplished using a shaker table having adjustable openings providing a means for customization of the leaf/stem fraction proportion ratio; STEP 3—Leaf Fraction Sizing is performed in a hammer mill; STEP 4—Leaf Fraction Pelletization is accomplished using a pellet mill; STEP 5—Pellet Packaging is done using a pellet product bagger which places the finished pellet animal feed product into bags for storage and transport; and STEP 6—Stem Processing is accomplished in either of two options, STEP 7—stem re-baling or STEP 8—stem fraction pelletization. In this way, the system and processing method of the present invention generates numerous high quality animal feed products from pre-formed forage feed hay bales.

In alternate embodiments of the Forage Feed Hay Bale Fractionation System and Feed Product Processing Method part of the processing plant is housed within a mobile unit consisting of a tractor trailer or towable trailer configuration. This mobile processing unit would have the capability to perform at least STEP 1 Bale Grinding and STEP 2 Fractionation of Leaves and Stems, on a remote site, or in the field at the farm or ranch, and accomplish the forage feed hay bale processing and production of fractionated leaf and fractionated stem portions for transport to a processing facility for further processing.

Forage Feed Hay Bale Fractionation System and Feed Product Processing Method primary features will include as prominent design and operational features: within a bale processing plant: (1) a bale grinder/processor; (2) a fractionating shaker table with a grate assembly; (3) a sizing hammer mill; (4) a leaf fraction pellet mill; (5) augers for moving leaf and stem fractions; (6) a pellet bagger; (7) a stem fraction re-baler; and (8) a stem fraction pellet mill. Within a mobile unit, items (1) a bale grinder; (2) a shaker table; and (5) augers for moving leaf and stem fractions would be present.

With respect to the above description then, it is to be realized that the optimum dimensional relationships for the parts of the Forage Feed Hay Bale Fractionation System and Feed Product Processing Method, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Forage Feed Hay Bale Fractionation System and Feed Product Processing Method. Further, since numerous modifications and changes will readily occur to those skilled in the art, it is not desired to limit the Forage Feed Hay Bale Fractionation System and Feed Product Processing Method to the exact construction and operation shown and described, and accordingly, all suitable modifications and equivalents may be resorted to falling within the scope of this application.

BRIEF DESCRIPTION OF THE DRAWINGS

The accompanying drawings, which are incorporated in and form a part of this specification, illustrate embodiments of the Forage Feed Hay Bale Fractionation System and Feed Product Processing Method and together with the description, serve to explain the principles of this application.

FIG. 5 depicts a flow chart of the detailed processing steps of STEP 3 Leaf Fraction Sizing, STEP 4 Leaf Fraction Pelletization and STEP 5 Pellet Packaging of the Fractionated Leaf Portion process.

DETAILED DESCRIPTION OF THE PREFERRED EMBODIMENTS

As required, the detailed embodiments of the present Forage Feed Hay Bale Fractionation System and Feed Product Processing Method 10, 110 and 210 are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

Figure 1:
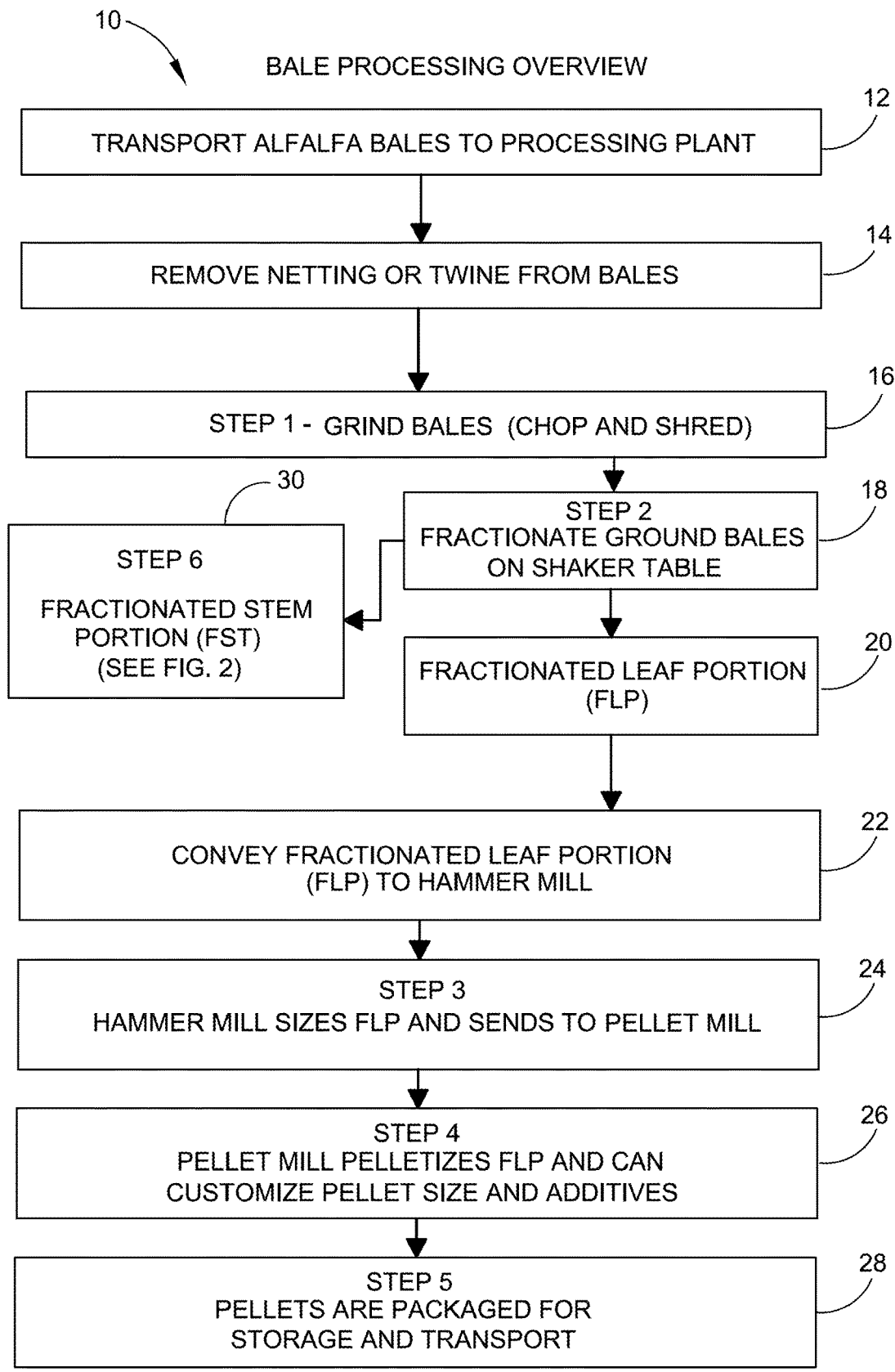
FIG. 1 depicts a flow chart of the overview steps of the Forage Feed Hay Bale Fractionation System and Feed Product Processing Method in fractionating hay bales and producing animal feed pellet products from the resulting leaf fraction.

FIG. 1 depicts a flow chart of the overview steps of the in processing plant facility Forage Feed Hay Bale Fractionation System and Feed Product Processing Method 10 in fractionating hay bales and producing animal feed pellet products from the resulting leaf fraction. As seen in FIG. 1, bales are transported to the processing plant facility 12, then placed on the bale grinder false floor where the netting or twine is removed from the bales 14. To begin, STEP 1—Bale Grinding, is performed using a modified bale grinder/processor to chop and shred the bale into small pieces 16. STEP 2—Fractionation of Leaves and Stems 18 from the ground, chopped and shredded bales is accomplished using a shaker table having adjustable speed and adjustable opening size providing a means for customization of the leaf/stem fraction proportion ratio, which generates a fractionated leaf portion (FLP) 20 and a fractionated stem portion (FSP) 30. An auger conveys the FLP to a hammer mill 22, and in STEP 3—Leaf Fraction Sizing is performed in a hammer mill 24. After sizing, the sized FLP is sent to a pellet mill for STEP 4—Leaf Fraction Pelletization 26 and pelletization of the FLP is accomplished using a pellet mill. Depending on the dies used within the pellet mill, varying sized pellets are generated 26. Additives can also be added in a customized fashion 26 during this pelletization step. Next, STEP 5—Pellet Packaging 28 is typically done using a pellet product bagger which places the finished pellet animal feed product into bags for storage and transport.

Figure 2:
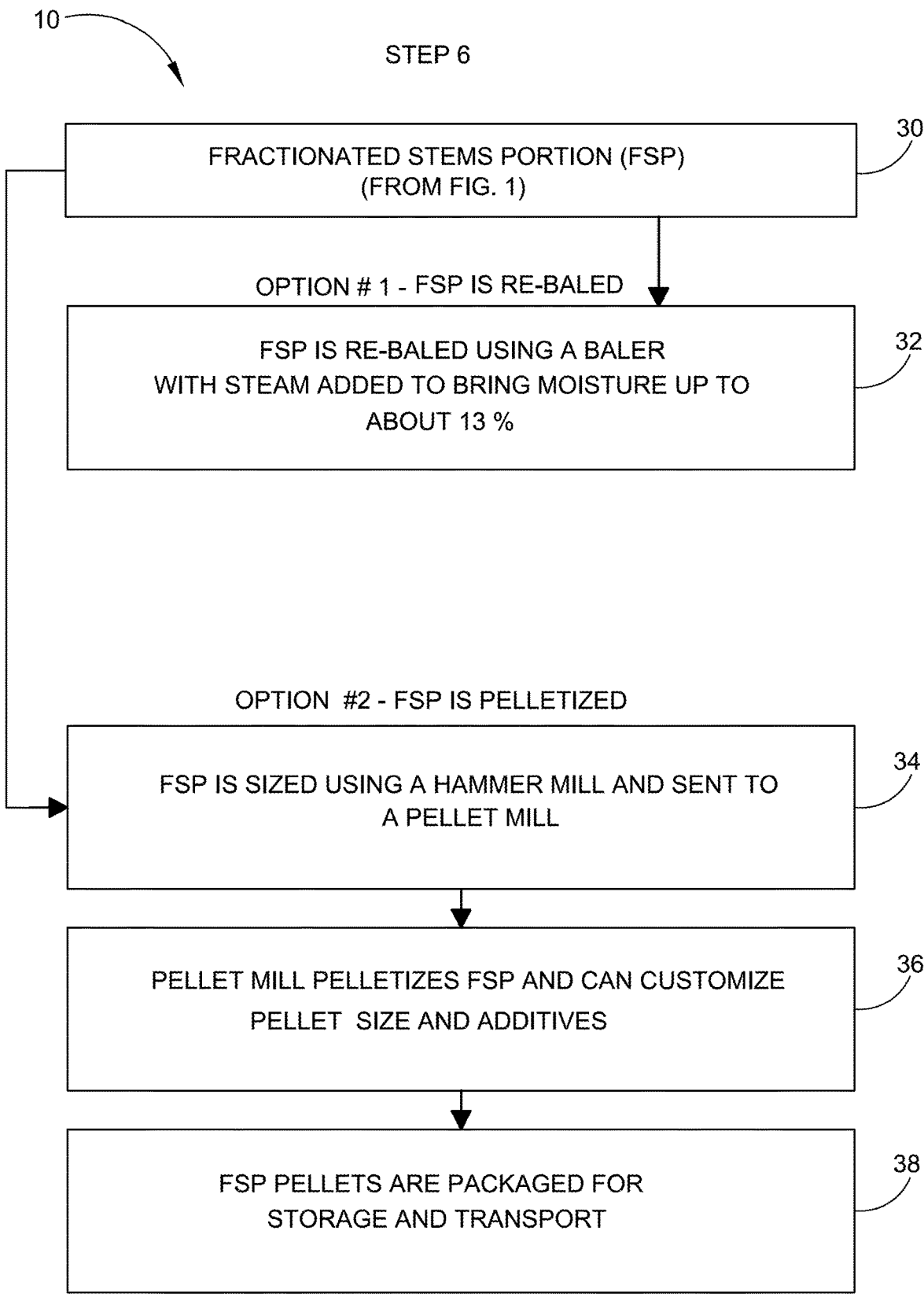
FIG. 2 depicts a flow chart of the overview steps of the Forage Feed Hay Bale Fractionation System and Feed Product Processing Method in fractionating hay bales and producing animal feed pellet products from the resulting stem fraction.

During STEP 2—Fractionation, a fractionated stem portion (FSP) 30 is also generated for further processing and STEP 6—Stem Processing is accomplished in either of two separate options (see FIG. 2). In this way, the system and processing method of the present invention generates numerous high quality customized animal feed products out of the FLP and FSP sourced from ground and fractionated pre-formed forage feed hay bales.

FIG. 2 depicts a flow chart of the overview steps of the Forage Feed Hay Bale Fractionation System and Feed Product Processing Method 10 in fractionating hay bales and producing animal feed pellet products from the resulting stem fraction. STEP 6—Stem Processing 30 is accomplished in either of two options: STEP 7—Option #1 stem re-baling 32 or STEP 8—Option #2 stem fraction pelletization 34. In Option #1 the FSP 30 is re-baled 32 using a baler. Because the stem fraction is dry, during this re-baling process steam is added to the FSP 30 to bring its moisture content back up to about 13% (for more detail see FIG. 6). In Option #2 the FSP 30 is sized using a hammer mill and after sizing, is sent to a pellet mill 34. The pellet mill then generates pellets from the FSP and allows for customizing size and adding of additives to the generated FSP pellets 36. The FSP pellets are then packaged, typically bagged, for storage and transportation 38. In this way, the system and processing method of the present invention generates numerous high quality customized animal feed products out of both the FLP and the FSP sourced from ground and fractionated pre-formed forage feed hay bales.

Figure 3:
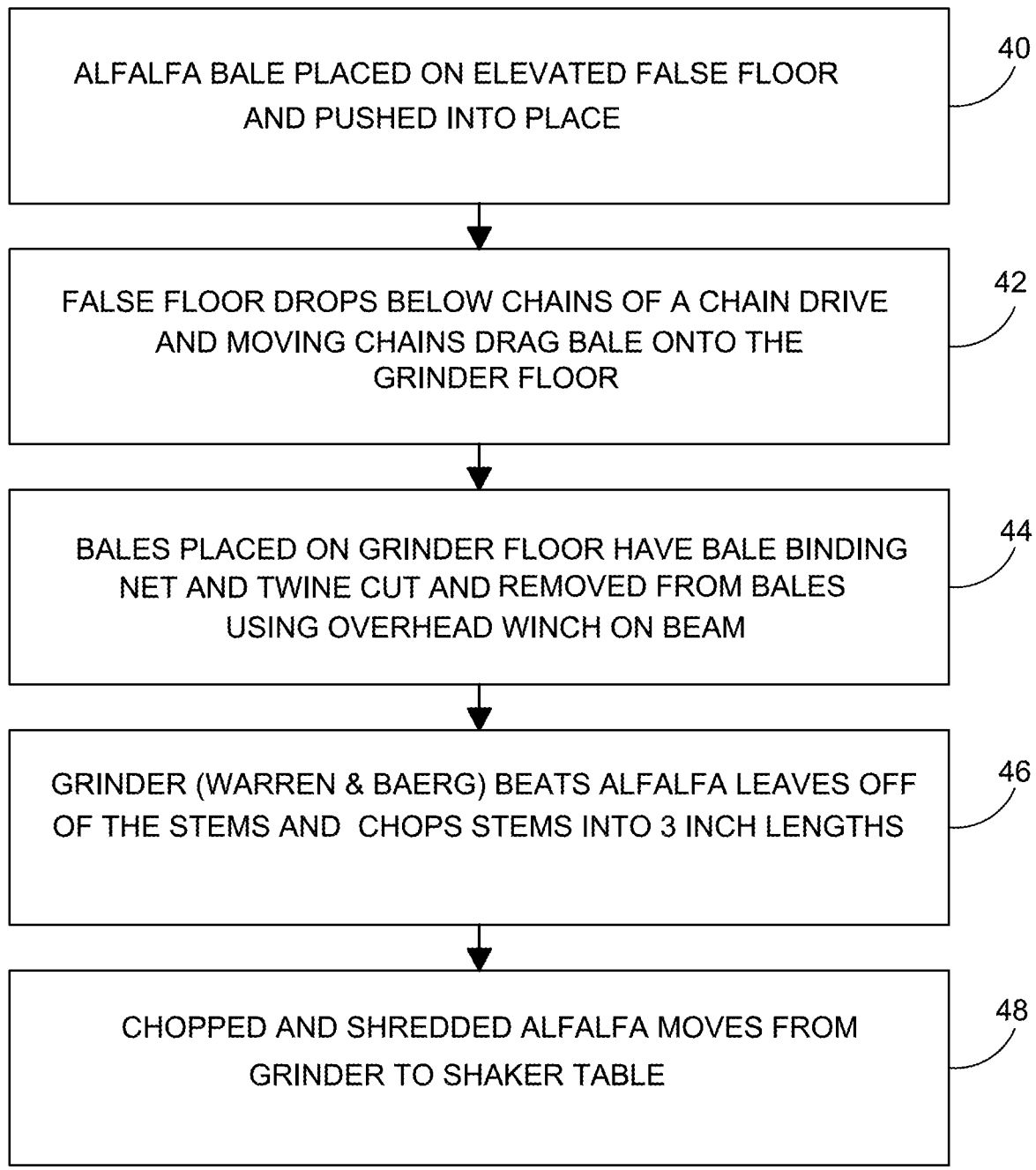
FIG. 3 depicts a flow chart of the detailed processing steps of STEP 1 Grinding Bale process.

FIG. 3 depicts a flow chart of the detailed processing steps of STEP 1 Bale Grinding process. STEP 1—Bale Grinding. In STEP 1 alfalfa bales that have been transported to the processing plant are placed on the bale grinder. The current bale grinder being used is a modified Kirby agricultural model bale processor. This bale grinder has been modified from a tractor-run, hydraulic power takeoff to an electrical power system. The power takeoff unit and hydraulic components were removed and replaced with three electric motors running each of the knife systems. It is anticipated that any bale grinder can be modified to work within the present inventive process.

The bale grinder loading table has been modified to include a false floor that can be both raised and lowered and a chain drive built in to the floor in order to efficiently load and move alfalfa bales into the bale grinder. An alfalfa bale is placed on the elevated false floor and pushed into place 40. The false floor then drops below the chains of the chain drive mechanism, allowing the chains to securely grab and drag the bale into the grinder processor 42.

Bale binding netting and/or twine must be removed from alfalfa bales before being introduced to the chopping knives of the grinder. Once bales are in place on the grinder table, plant employees in safety harnesses climb on top of bales to cut and remove twine. Twine is manually cut with a handheld knife and the ends of the six or more strands are gathered and knotted together. This bundle of twine is then pulled from the bale using an overhead winch on a cable 44.

The current grinder system has three or more internal drums, with a plurality of chopping knives on each drum. For example, a grinder set-up such as the Warren & Baerg style of grinder may be employed. The drums rotate, and the chain drag system on the floor of the table propels the baled alfalfa to the chopping knives. The rotating multiple drums with a plurality of chopping knives spin rapidly which allows the Warren & Baerg style bale grinder/processor to mechanically beat the alfalfa leaves off of the alfalfa stems while at the same time chopping the alfalfa stems into 3 inch lengths 46, thus beginning the fractionization process. Once chopped and shredded by the grinder, ground alfalfa moves from the grinder to the shaker table 48 on a conveyor.

Figure 4:
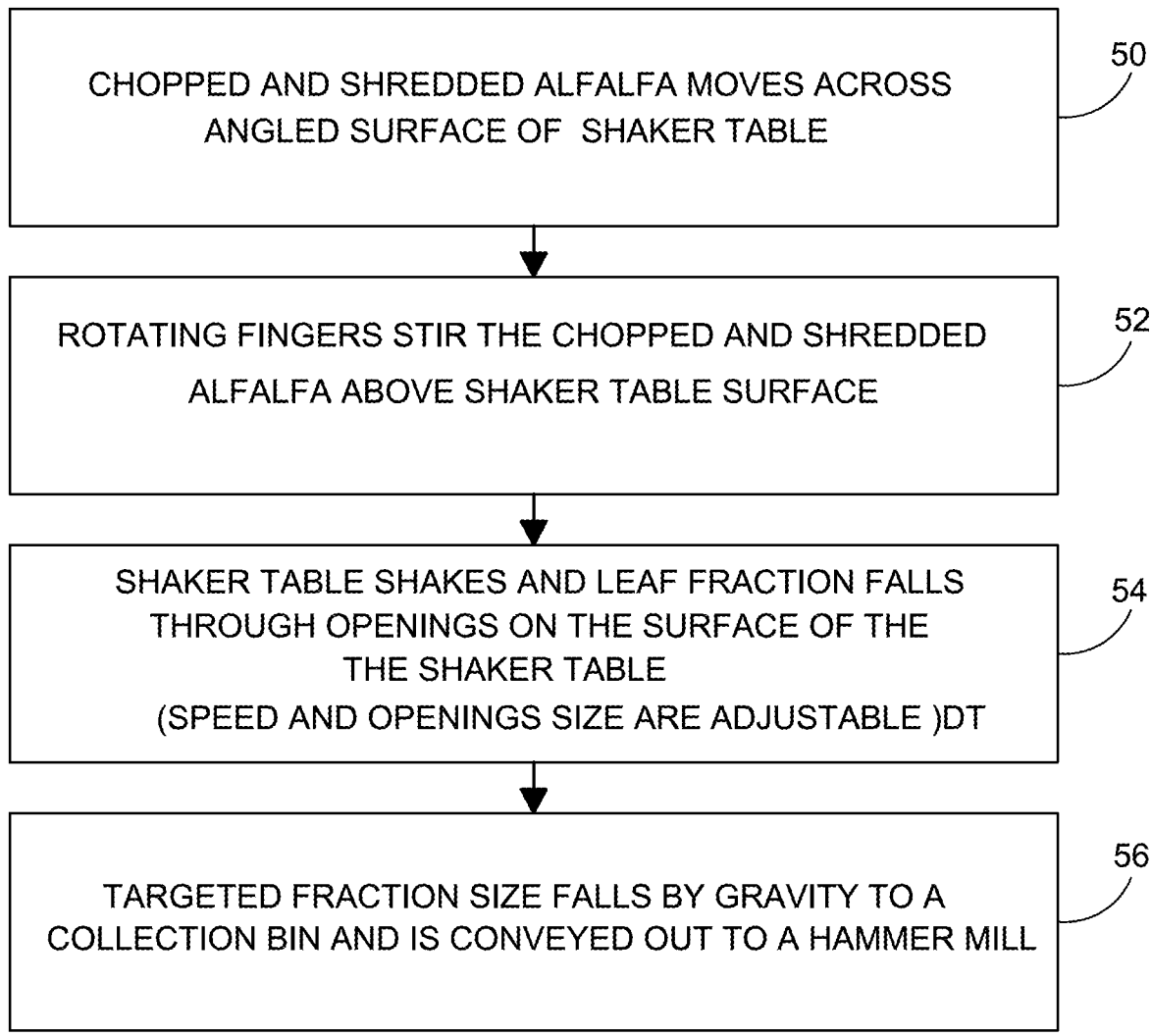
FIG. 4 depicts a flow chart of the detailed processing steps of STEP 2 Fractionation of Leaves and Stems process.

FIG. 4 depicts a flow chart of the detailed processing steps of STEP 2 Fractionation of Leaves and Stems process. STEP 2—Fractionation of Leaves and Stems. In STEP 2 alfalfa moves across the angled surface of a shaker table 50 in order to sort and separate the leaf and stem fractions. A set of rotating fingers, similar to what is found in hay balers, are positioned above the shaker table at its center to stir the chopped hay 52. The stirring fingers pick and drop the hay as it passes over the shaker table. This disruption of the leaves and stem pieces ensures the fractions are separated thoroughly, allowing the targeted fraction to drop out through the metal openings of the shaker table 54. This process of leaf/stem fractionation or separation is facilitated by the variable shaking speed of the shaker table as well as the variable opening size of the shaker table grate or grates. One or more shaker table grates may be employed. The leaves fall through the openings while the stems shake off the grate and continue on to a drop off and are moved off of the shaker table. In this way, the leaf portion and the stem portion of the ground bales is separated, or fractionated.

Elements of the shaker table include: A table set on an angle with the higher elevation being closest to the chopper/grinder feed conveyor. Through gravity and the shaking motion, the chopped product travels along the table. Metal openings on the table's surface allow product of a specific size to drop down through the table 56 to a collection bin, then one or more augers or conveyors convey the collected fractionated leaf product out of the collection bin, which is then sent to a hammer mill 56.

The shaker table is made with an adjustable grate assembly to be able to modify the expanding metal openings according to product needs; larger openings allow more stems to be added directly to the leaf fraction at this step while smaller openings allow fewer stems to fall into the leaf fraction. This expanding shaker system allows for protein customization in the final product according to each individual customers' animal feed leaf/stem ratio specifications. It is anticipated that one or more grates may be used, and the opening size is adjusted by movement of the grates relative to each other (see FIG. 9A-9D below). These grates may have any shaped openings which slide relative to each other to open or close the opening, thereby increasing and decreasing the size of the leaf and stem portions which fall by gravity into a collection bin located below the grates assembly.

In an alfalfa plant, leaves are consistently about 31% protein and stems are about 12% protein. In addition to protein, both leaves and stems have values for fiber, vitamins and other nutritional qualities that may be used to create a custom blend for final alfalfa products. In alfalfa, leaves are leaves. Their nutritional value is consistent throughout the plant's growing cycle and may therefore be considered a constant when calculating nutritional value of leaf/stem mixes. The variable in alfalfa plant nutritional value is found in the stems—nutritional composition of alfalfa stems depends on many factors, including maturity, height, and lignification. The present embodiment of the adjustable shaker table, with respect to speed of shaking and size of grate assembly opening, allows for customization of the leaf-stem ratio in a given feed product processing.

FIG. 5 depicts a flow chart of the detailed processing steps of STEP 3 Leaf Fraction Sizing, STEP 4 Leaf Fraction Pelletization and STEP 5 Pellet Packaging of the Fractionated Leaf Portion process. STEP 3—Leaf Fraction Sizing. Fractionated alfalfa leaf portion is transported from shaker table to a hammer mill. The hammer mill sizes the particles that drop out of the shaker table grate assembly in preparation for the pellet mill 60. Sized alfalfa leaf fraction is then sent from hammer mill to pellet mill.

STEP 4—Leaf Fraction Pelletization. Pelletizing the hay leaf fraction is a way of densifying the product. Depending on the die used in the pellet mill, the size and length of the alfalfa pellets may be customized according to customer animal feed product specifications 62. Any additive customization happens during the pelletization step 64. The alfalfa leaf fraction can be sold as a straight product or be enhanced with nutritional supplements and other additives per customer animal feed product requirements.

STEP 5—Pellet Packaging. Pellets are then packaged 66. Pellets are currently being bagged, which has proven to be a time-tested and effective way to store and transport pellet animal feed products.

Figure 6:
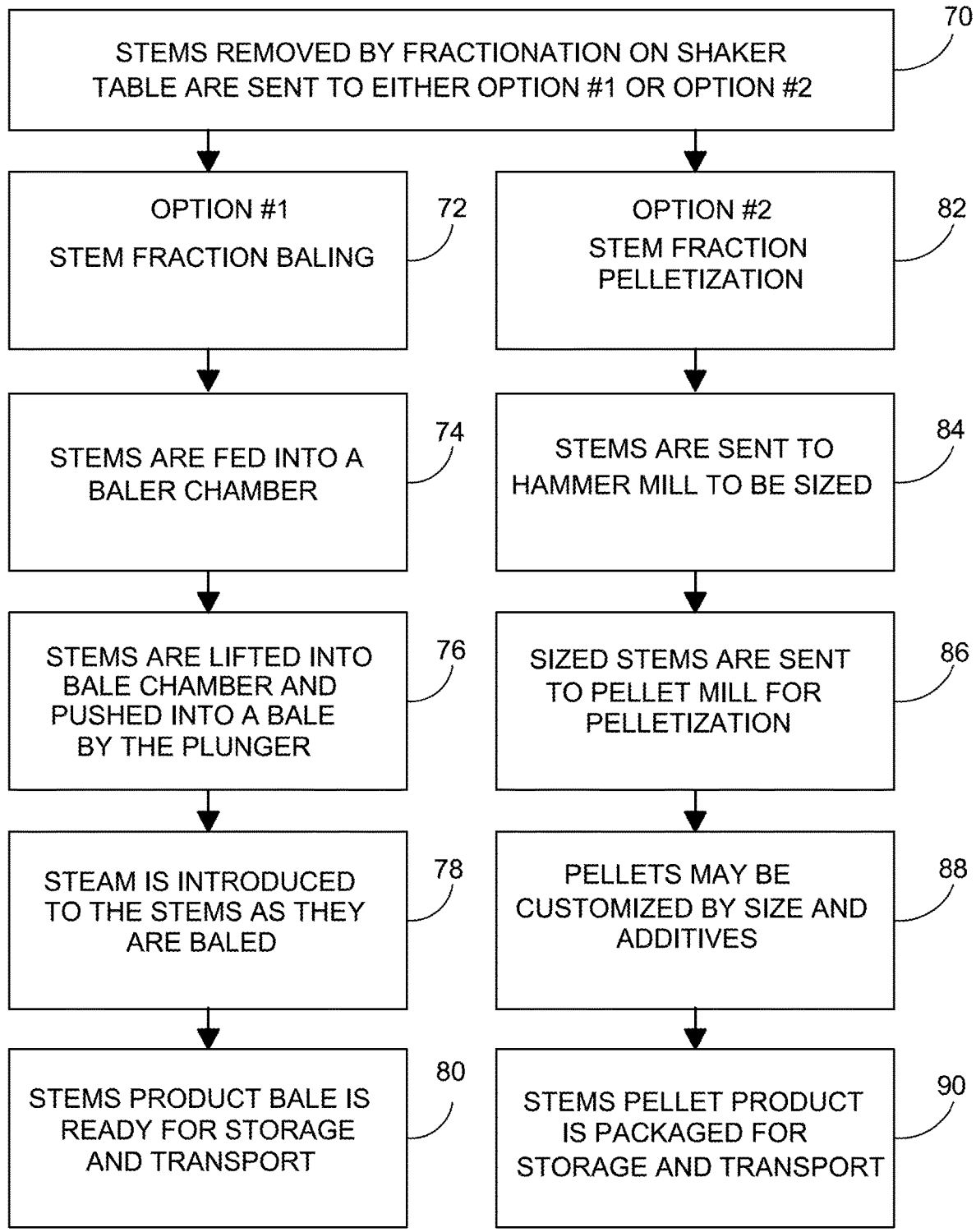
FIG. 6 depicts a flow chart of the detailed processing steps of STEP 6 Stem Processing, illustrating the two options: Stem Fraction Re-baling and Stem Fraction Pelletization.

FIG. 6 depicts a flow chart of the detailed processing steps of STEP 6 Stem Processing, illustrating the two options: Stem Fraction Re-baling and Stem Fraction Pelletization 70.

STEP 6—Stem Processing. The resulting alfalfa stem fraction is either re-baled or pelletized.

Option 1—Stem Fraction Re-baling 72. A Freeman baler is currently best option due to operational needs, however, other baler may be used as well. Stems are fed into the baler chamber 74. Once the chamber is filled, the product is lifted up into the bale chamber and pushed into the bale by the plunger 76. Currently, the Freeman baler is the only agricultural baler with the ability to create quality bales without running at full capacity. Other balers run the plungers continuously which leads to weak structural integrity of bales when product is fed slowly into the machine, which is the case here with the re-baling of the fractionated stem portion.

Steam is introduced to the stems as they are re-baled 78. Stems are dry when they are brought into the plant. Steam is introduced to the stems, bringing them up to ~13% moisture. This moisture level allows the baler to create beautiful, tight, solid bales. Re-baled stem product bales are ready for storage and transport 80.

Option 2—Stem Fraction Pelletization 82. Stems are sent to a hammer mill for sizing 84. Sized alfalfa stem fraction is sent from hammer mill to pellet mill 86. Pelletizing the alfalfa stem fraction is a way of densifying the product. Depending on the die used in the pellet mill, the size and length of the alfalfa pellets may be customized according to customer specifications. Any additive customization happens during the pelletization step. The alfalfa stem fraction can be sold as a straight product or be enhanced with nutritional supplements and other additives per customer requirements 88. Pellets are then packaged 90; pellets are currently being bagged, which has proven to be an effective way to store and transport pellet products.

Figure 7:
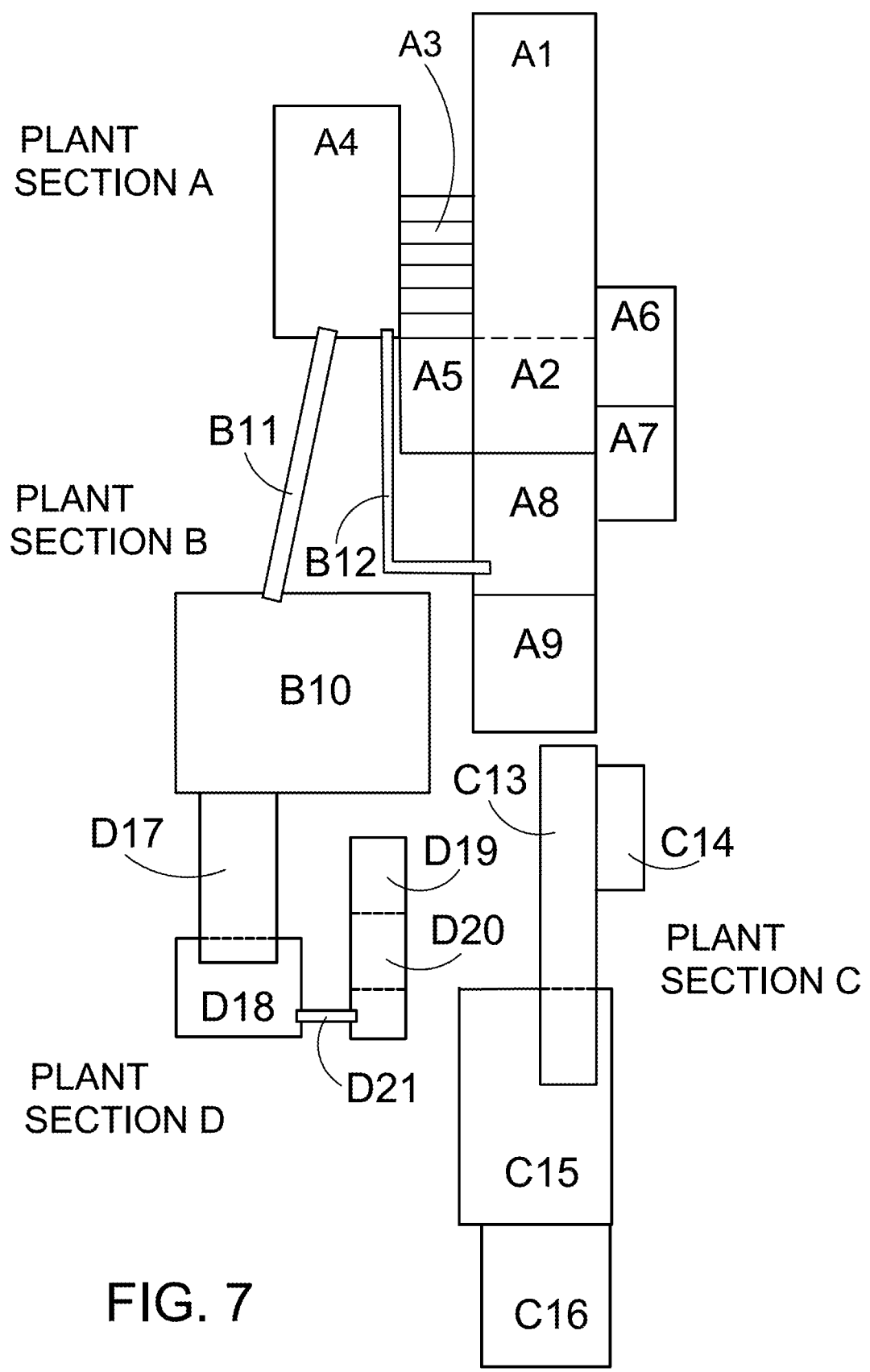
FIG. 7 depicts a processing plant floorplan illustrating the relative position of the component machinery used to process bales into high quality customized animal feed pellet products.

FIG. 7 depicts an example of one possible processing plant floorplan illustrating the relative position of the component machinery used to process bales into high quality customized animal feed pellet products. Air an vacuum systems are run throughout the plant in order to keep dust to a minimum. A key to processing plant facility components by plant section are as follows (with approximate dimensions in parentheses):

Section A
- A1. Kirby Shredder/Bell Conveyance Deck (10'×38')
- A2. Kirby Shredder Knives (8'×10')
- A2. Above: Product Stirrer
- A3. Stairs to Twine Removal & Hammer Mill (5'×15')
- A4. Top: Hammer Mill & Air/Dust Removal System (10'×22')
- A4. Middle: Cross Conveyor
- A4. 2nd Middle: Air Lock
- A4. Bottom: Twin Screw Metering Auger
- A5. Shredder Knife Motors (5'×8')
- A6. Dust Feedback Return (10'×5')
- A7. Shredder Dust Removal System (10'×5')
- A8. Leaf Separation Shaker Table (12'×10')
- A9. Stem Evenflow Tank (12'×10')

Section B
- B10. Pellet Mill (20'×16')
- B11. Hammer Mill to Pellet Mill Elevation Auger
- B12. Leaf Separation Table To Hammer Mill Auger Section C
- C13. Stem Elevator Conveyor (28'×4')
- C14. Baler/Hammer Mill Dust Removal (10'×4')
- C15. Baler (12'×20')
- C16. Bale Accumulator (12'×10')

Figure 8:
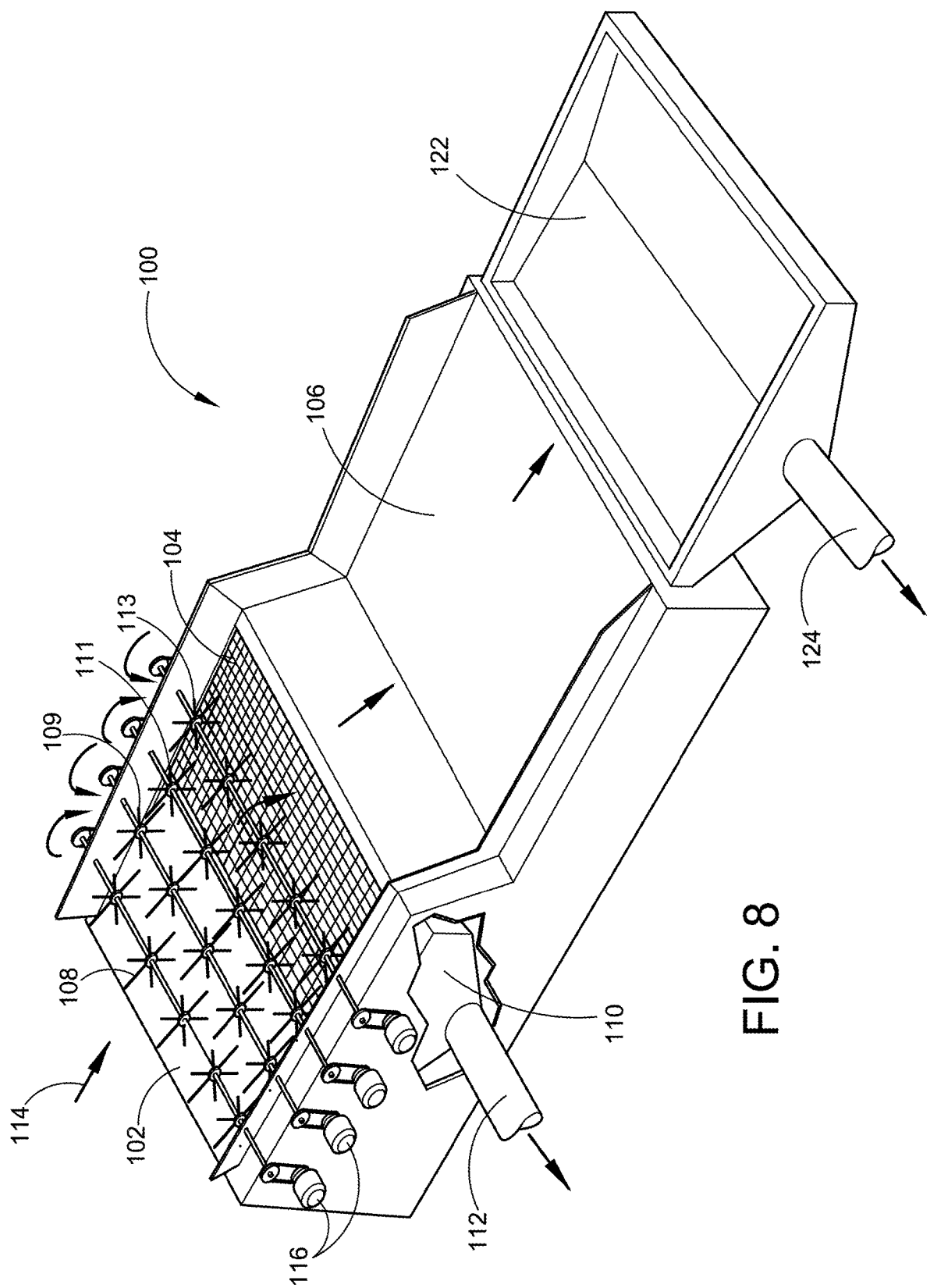
FIG. 8 depicts a top and side perspective view of the shaker table assembly illustrating the angled surface, rotating knife assemblies and separation grate assembly.

Section D
- D17. Pellet Mill to Pellet Color Conveyor (5'×15')
- D18. Pellet Cooling Tower (10'×8')
- D19. Tote Bagger & Scale (4'×10')
- D20. Grizzlied Screen (4'×5')
- D21. Auger to Pellet Screening FIG. 8 depicts a top and side perspective view of the shaker table assembly 100 illustrating the angled downward sloping table surface 102, rotating knife assemblies 108 and 109, and separation grate assembly 104. The ground bales are fed onto the shaker table 100 in the direction of arrow 114. The surface of the shaker table is sloped and the ground bale material moves into the rotating finger assemblies 108, 109, 111 and 113. The rotating fingers 108, 109, 111 and 113 further chop and fluff up the ground hay preparing it for the shaker table grate assembly 104. As the material to be fractionated moves across the grate assembly 104 it falls by gravity through the openings in the grates. The grate assembly 104 includes one or more grates, in which the opening size is adjustable (see FIG. 9A-9D). The mechanism of the shaker table is common in conventional shaker tables used for gold and heavy metal mining and for various agricultural applications. The speed of the shaking is adjustable through modulation of the electric motor (not shown) attached to the shaker table 100 which actuates the shaking motion. The entire shaker table shakes in a sideways and slight up and down motion. Through the use of adjusted speeds of shaking, and adjusted opening size of the grate assembly, the targeted fraction of leaves and stems is achieved. The leaf fraction portion (FLP) falls through the grate assembly to a collection bin 110 and is moved out of the collection bin 110 by auger 112 (see the motion indication arrows). The stem fraction portion (FSP) travels along the grate assembly then drops off down to another sloped part of the shaker table 106 (see the motion indication arrows) and falls into a second collection bin 122 (see the motion indication arrows). The FSP is then moved out of collection bin 122 by auger 124 (see the motion indication arrows). In this way, two separate hay bale fractions are efficiently collected, the FLP and the FSP, to be further processed into customized animal feed products.

Figure 9A:
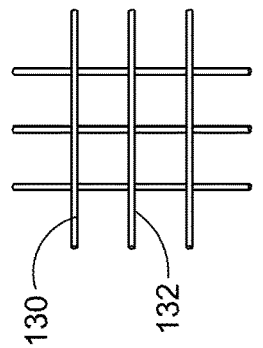
FIG. 9A depicts a partial top plan view of the separation grate assembly where the two grates are adjusted for a minimum opening size.

FIG. 9A depicts a partial top plan view of the separation grate assembly where the two grates 130 and 132 are adjusted for a minimum opening size. The individual grates 130 and 132 are moveable relative to each other on order to increase or decrease the opening size. Here, they are shown move adjusted to be overlapping to create a minimum opening size mesh.

Figure 9B:
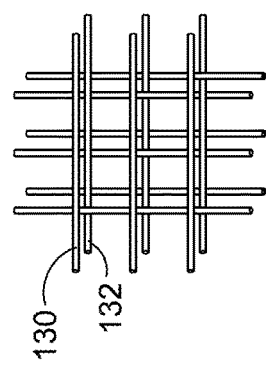
FIG. 9B depicts a partial top plan view of the separation grate assembly where the two grates are adjusted for a moderate opening size.

FIG. 9B depicts a partial top plan view of the separation grate assembly where the two grates 130 and 132 are adjusted for a moderate opening size. The individual grates 130 and 132 are moveable relative to each other on order to increase or decrease the opening size. Here, they are shown move adjusted to be overlapping to create a moderate opening size mesh.

Figure 9C:
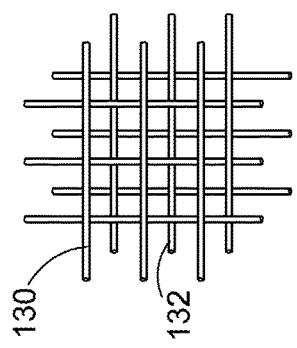
FIG. 9C depicts a partial top plan view of the separation grate assembly where the two grates are adjusted to be in line for a maximum opening size.

FIG. 9C depicts a partial top plan view of the separation grate assembly where the two grates 130 and 132 are adjusted to be in line for a maximum opening size. The individual grates 130 and 132 are moveable relative to each other on order to increase or decrease the opening size. Here, they are shown move adjusted to be overlapping to create a maximum opening size mesh.

Figure 9D:
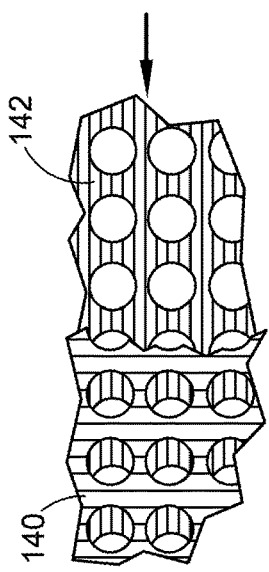
FIG. 9D depicts a partial top plan view of an alternate embodiment of the separation grate assembly having circular openings adjusted for a partial moderate opening size.

FIG. 9D depicts a partial top plan view of an alternate embodiment of the separation grate assembly having two grates 140 and 142 with circular openings adjusted for a partial moderate opening size. The individual grates 140 and 142 slide relative to each other to generate minimum and maximum opening sizes. In this round configuration, it is possible to close the opening down to very small sizes to be more effective in the collection of FLP which is ground down to very small sizes.

Figure 10:
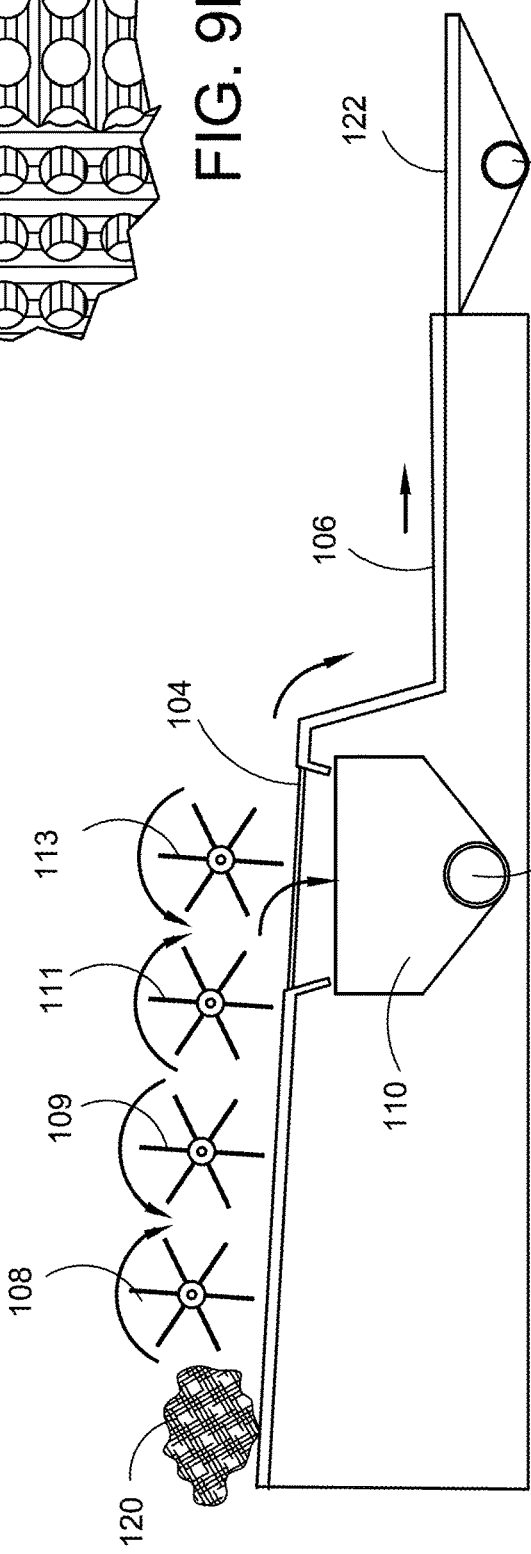
FIG. 10 depicts a side elevational view of the shaker table assembly illustrating the angled surface, rotating knife assemblies, position of the separation grate assembly above a leaf fraction collection bin.

FIG. 10 depicts a partial cross-sectional side elevational view of the shaker table assembly illustrating the angled surface, rotating finger assemblies 108, 109, 111 and 113, and the position of the separation grate assembly 104 above a leaf fraction collection bin 110 having an auger 112. The ground bale material 120 comes out of the grinder and is further chopped, stirred and fluffed up by the rotating fingers 108, 109, 111 and 113 (see movement indication arrows). The chopped and stirred hay bale material then travels over the grate assembly 104 where the opening size determines what targeted leaf fraction size falls through the grate (see movement indication arrows) and is deposited into the collection bin 110 to be moved out of the collection bin 110 by auger 112. The stem fraction continues over the shaker table and does not fall through the grate depending on the size of the grate openings (see movement indication arrows). The stem fraction then moves down the lower portion of the shaker table 106 and into a stem fraction collection bin 122 to be conveyed out of this second stem fraction collection bin 122 by auger 124. In this way, two separate hay bale fractions are efficiently collected, the FLP and the FSP, to be further processed into customized animal feed products.

Figure 11:
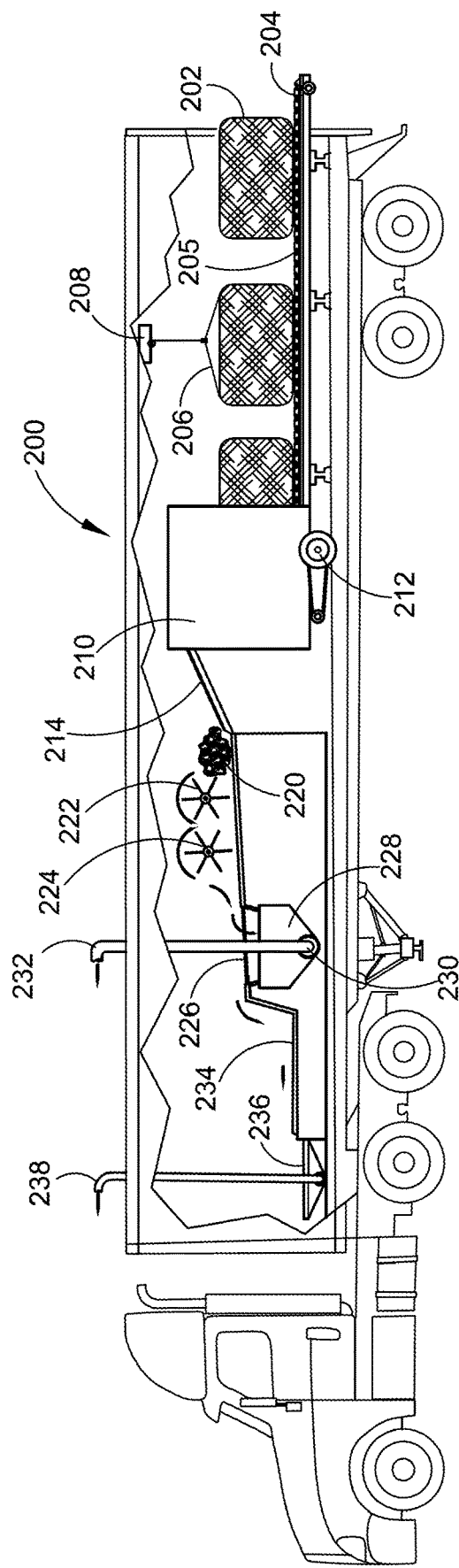
FIG. 11 depicts a cutaway side elevational view of a mobile hay bale processing unit within a tractor trailer.

FIG. 11 depicts a cutaway side elevational view of a mobile processing unit within a tractor trailer 200. Preformed hay bales 202 are loaded onto the false floor 204 of the grinder processor. The floor drops down exposing the chain drive 205 which acts to propel the bales into the grinder 210 which is powered by grinder motor 212. Before reaching the grinder 210, the netting or twine 206 binding the bale together is removed by overhead winch 208. Ground bale material 220 exits the grinder after being chopped and shredded down chute 214 and on to the shaker table assembly having rotating chopping knives 222 and 224. The rotating chopping knives 222 and 224 chop, stir and fluff up the bale material before it reaches the shaker table grate assembly 226. Leaf fraction falls by gravity (see movement indication arrows) through the adjusted opening size of the grate assembly 226 into a collection bin 228. The fractionated leaf portion (FLP) is then moved by an auger 230 to an elevator chute 232 and deposited into an external collection bin or a truck transport vehicle positioned alongside the tractor trailer processing mobile unit 200. The fractionated stem portion (FSP) travels down the drop off (see movement indication arrows) after the grate 226 onto the lower surface 234 and then into collection bin 236 where it is moved by auger and elevator 238 to an external collection bin or a truck transport vehicle positioned alongside the tractor trailer processing mobile unit 200.

Figure 12:
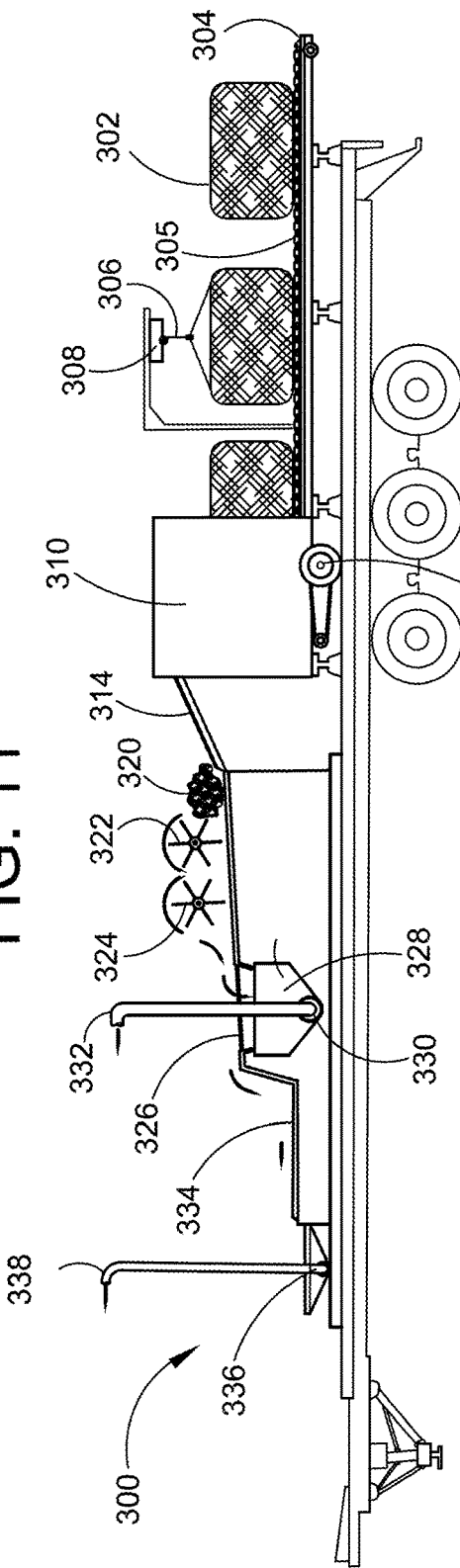
FIG. 12 depicts a side elevational view of a mobile hay bale processing unit on a towable trailer.

FIG. 12 depicts a side elevational view of a mobile processing unit on a towable trailer 300. This mobile processing unit on a towable trailer 300 works in the same way as the tractor-trailer mobile unit 200 described above. Preformed hay bales 302 are loaded onto the false floor 304 of the grinder processor. The floor drops down exposing the chain drive 305 which acts to propel the bales into the grinder 310 which is powered by grinder motor 312. Before reaching the grinder 310, the netting or twine 306 binding the bale together is removed by overhead winch 308. Ground bale material 320 exits the grinder after being chopped and shredded down chute 314 and on to the shaker table assembly having rotating chopping knives 322 and 324. The rotating chopping knives 322 and 324 chop, stir and fluff up the bale material before it reaches the shaker table grate assembly 326. Leaf fraction falls by gravity (see movement indication arrows) through the adjusted opening size of the grate assembly 326 into a collection bin 328. The fractionated leaf portion (FLP) is then moved by an auger 330 to an elevator chute 332 and deposited into an external collection bin or a truck transport vehicle positioned alongside the tractor trailer processing mobile unit 300. The fractionated stem portion (FSP) travels down the drop off (see movement indication arrows) after the grate 326 onto the lower surface 334 and then into collection bin 336 where it is moved by auger and elevator 338 to an external collection bin or a truck transport vehicle positioned alongside the tractor trailer processing mobile unit 300.

In summary the Forage Feed Hay Bale Fractionation System includes a processing plant having the following components: (1) a bale grinder/bale processor component; (2) a fractionation component; (3) a sizing component; (4) a pelletizing component; and (5) a pellet packaging component, for fractionation and processing of the leaf portion of a hay bale. In addition, for further processing the stem portion of a hay bale, the system further includes: (6) a re-baling component; (7) a stem portion pelletizing component; and (8) a stem portion pellet packaging component.

The mobile unit system for processing bales includes: (1) a bale grinder/bale processor component; (2) a fractionation component; and (3) an auger and elevator component to remove the collected fractions from the mobile unit after the bale material has been processed into a leaf fraction and a stem fraction. These components are housed either within a tractor-trailer trailer section or an open separately towable 3-axle trailer configured on the flat bed of that 3-axle trailer.

Therefore, the Forage Feed Hay Bale Fractionation System and Feed Product Processing Method primary features will include as prominent design and operational features: within a bale processing plant: (1) a bale grinder/processor; (2) a fractionating shaker table with a grate assembly; (3) a sizing hammer mill; (4) a leaf fraction pellet mill; (5) augers for moving leaf and stem fractions; (6) a pellet bagger; (7) a stem fraction re-baler; and (8) a stem fraction pellet mill. Within a mobile unit, items (1) a bale grinder; (2) a shaker table; and (5) augers for moving leaf and stem fractions would be present.

The Forage Feed Hay Bale Fractionation System and Feed Product Processing Method 10, 200 and 300 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the Forage Feed Hay Bale Fractionation System and Feed Product Processing Method 10, 200 and 300 in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A system for processing hay bales into animal feed products, comprising:
   (a) a bale grinder/bale processor component capable of generating a ground, chopped, and shredded hay bale;
   (b) a fractionation processor component capable of fractionating said ground, chopped and shredded hay bale into a leaf fraction portion and a stem fraction portion, wherein said fractionation processor component includes a shaker table assembly and further wherein said shaker table assembly includes an angled shaker table with a sloping surface and with a variable shaking speed, rotating finger assemblies located above on upper surface of said shaker table assembly, and further including a grate at its center wherein said grate assembly includes two grates which are adjustable in opening size, and further wherein the opening size is adjusted by movement of the grates relative to each other;
(c) a hammer mill component capable of sizing said leaf fraction portion generated by said fractionation component;
(d) a pelletizing component capable of pelletizing said sized leaf fraction portion into leaf fraction portion pellets; and
(e) a pellet packaging component capable of packaging said leaf fraction portion pellets.

2. The system for processing hay bales into animal feed products according to claim 1, wherein said shaker table comprises an angle with a higher elevation being closest to the bale grinder/bale processor component, whereby through gravity and the shaking motion, a chopped product travels along said fractionation component shaker table assembly for the purpose of separating said ground, chopped and shredded hay bale into the leaf fraction portion and the stem fraction portion.

3. The system for processing hay bales into animal feed products according to claim 1, wherein said shaker table assembly includes the rotating finger assemblies, wherein said rotating finger assemblies are motor driven to further chop and fluff up the ground hay preparing it for the shaker table grate assembly.

4. The system for processing hay bales into animal feed products according to claim 1, wherein said grate assembly includes two individual grates which are adjustable in opening size and further wherein when the two individual grates are used the two individual grates are moveable relative to each other in order to increase or decrease the opening size.

5. The system for processing hay bales into animal feed products according to claim 4, wherein said grate assembly further include circular openings adjustable for a partial moderate opening size, whereby the individual grates slide relative to each other to generate minimum and maximum opening sizes.

6. The system for processing hay bales into animal feed products according to claim 1, wherein said the pelletizing component capable of pelletizing said sized leaf fraction portion into said leaf fraction portion pellets, further enables customization of pellet size and customization of additives.

7. The system for processing hay bales into animal feed products according to claim 1, wherein said stem fraction portion is re-baled.

8. The system for processing hay bales into animal feed products according to claim 1, wherein said stem fraction portion is sized and pelletized resulting in stem fraction pellets, and further wherein said resulting stem fraction pellets are packaged.

9. The system for processing hay bales into animal feed products according to claim 1, wherein said bale grinder/bale processor component capable of generating the ground, chopped, and shredded hay bale and the fractionation component capable of fractionating said ground, chopped and shredded hay bale into the leaf fraction portion and the stem fraction portion are housed in an enclosed tractor-trailer trailer section.

10. The system for processing hay bales into animal feed products according to claim 1, wherein said a bale grinder/bale processor component capable of generating the ground, chopped, and shredded hay bale and a fractionation component capable of fractionating said ground, chopped and shredded hay bale into the leaf fraction portion and the stem fraction portion are configured on a platform of a towable trailer.

* * * * *